Patented Dec. 14, 1948

2,456,583

UNITED STATES PATENT OFFICE 2,456,583

METHOD FOR PREPARING LEAD NITROAMINOGUANIDINE

Le Roy V. Clark, New Castle, Pa., assignor, by mesne assignments, to American Cyanamid Company, New York, N. Y., a corporation of Maine No Drawing. Application May 5, 1944, Serial No. 534,346

4 Claims. (Cl. 260—435)

The present invention relates to methods of preparing lead nitroaminoguanidine of relatively high density and to the compound thus prepared.

Patent 2,251,101 discloses the preparation of lead nitroaminoguanidine, hereinafter referred to as LNAG, by reacting lead hydroxide with nitroaminoguanidine, hereinafter referred to as NAG, in aqueous solution. The reacting menstruum is then cooled until LNAG is precipitated.

LNAG has been found to have desirable initiating explosive properties and is particularly applicable when used either with or without other explosive materials in blasting caps. However, when the lead salt is prepared according to the patented method, its apparent density is only about 0.4 gram per cc. This density is ordinarily too low for use in blasting caps without forcing the use of inordinately long shells, which would be unacceptable to the trade. This is because the LNAG crystals as above prepared are acicular and do not pack well. The spicules prevent close contact and result in a large amount of wasted space.

The principal object of the present invention, therefore, is to produce LNAG having densities greater than 0.4 gram per cc. and of a crystal size and structure such that the optimum amounts necessary to initiate a No. 6 blasting cap may be well contained within the space normally allotted to the initiator.

The surprising fact has been discovered that the crystal size and structure of LNAG may be desirably modified by the use of certain agents during the formation of the LNAG. As a result of this action, LNAG crystals may be produced which are non-spicular, dense, relatively large and in fact of a character entirely satisfactory for the purpose.

All factors being considered, an apparent density of a satisfactory LNAG should be greater than 0.4 gram per cc. and preferably between 0.68 and 1.00 gram per cc., although some higher densities have been obtained by practice of the hereinafter described process.

The discovery is based upon the fact that modified crystals of LNAG may be obtained if precipitated in the presence of a hydrophilic colloid, such as gelatin, agar-agar, animal glue, pepsin, methyl cellulose from 15 to 4000 centipoise types, or the like.

It has been found satisfactory to precipitate the LNAG in the presence of such a colloid where the latter is present in the proportion of from 0.001% of the weight of the lead hydroxide slurry, up.

The necessary quantity of colloid dispersed in water may either be added with the lead hydroxide slurry or the NAG, or divided between them both, it being only important that the LNAG crystals be permitted to form in the presence of the aqueously dispersed colloid.

In contacting the lead hydroxide with the NAG in the presence of the colloid, it is important that the reactants not be added too fast and that sufficient agitation be used to keep the solid materials properly suspended. This insures complete reaction and avoids occlusions of unreacted reactants.

The hydrophilic colloids used according to the present discovery may be prepared by first soaking in water followed by heating until completely peptized. Ordinarily heating to 60° C. is adequate although gelatine does not exhibit its modifying properties to a maximum degree unless boiled. Therefore, peptization is the criterion rather than temperature. The same procedure may be used to prepare solutions of agar-agar, animal glue and pepsin as crystal modifying agents. Methyl cellulose may be dissolved by first allowing it to soak for 20 to 30 minutes with agitation in boiling water, diluting with water and permitting the agent to cool to room temperature while stirring until smooth. In all cases, the ratio of water to colloid should be such that complete peptization occurs.

The following examples show the preparation of LNAG according to the present invention, with the apparent density of the produce in comparison with LNAG prepared substantially according to the above patent and in the absence of a crystal modifying colloid.

TABLE I

*Effect of crystal-modifying agents on the apparent density of LNAG*

| Colloid | Concentration Used in Slurrying Lead Hydroxide, Per Cent | Apparent Density, Gms./cc. |
|---|---|---|
| Methocel, 15 cps | 0.050 | 0.95 |
| Do | 0.030 | 0.78 |
| Methocel, 4000 cps | 0.060 | 1.13 |
| Do | 0.050 | 0.79 |
| Do | 0.030 | 0.55 |
| Pepsin | 0.40 | 0.70 |
| Do | 0.20 | 0.67 |
| Do | 0.10 | 0.70 |
| Glue (Animal) | 0.10 | 1.12 |
| Do | 0.05 | 0.91 |
| Gelatin | 0.050 | 1.15 |
| Do | 0.044 | 1.03 |
| Do | 0.036 | 0.79 |
| Do | 0.036* | 0.94 |
| Do | (**) | 0.83 |
| Do | (***) | 1.12 |
| Agar-Agar | 0.180**** | 0.76 |
| Do | 0.360**** | 0.70 |
| Combination | {0.007, Agar-Agar**** / 0.036, Gelatin} | 0.92 |
| None | | 0.38 |

*The lead hydroxide used in this run was precipitated in the presence of 0.001% gelatin.
**The lead hydroxide used here was prepared in the presence of 0.003% gelatin. No additional gelatin was added to the lead hydroxide slurry.
***The lead hydroxide employed in this run was prepared in the presence of 0.005% gelatin. No additional gelatin was added to the lead hydroxide slurry.
****In these runs, the crystal-modifying agents were divided between the two reacting slurries instead of being entirely incorporated in the lead hydroxide slurry.

The runs in Table I convey a rather general idea of the range over which the colloids can be used. These figures, however, are not to be taken as indicating minimum and maximum quantities of modifying agents as resultant apparent densities of LNAG are also somewhat affected by the manner in which the agent is incorporated, stirring conditions, addition rates, etc., as shown by the following table:

TABLE II

*Effect of varying the rate of which lead hydroxide is added to the nitroaminoguanidine slurry*

| Concentration of Gelatin Used in Slurrying Lead Hydroxide, Per Cent | Addition Time,[1] Minutes | Apparent Density, Gms./cc. |
|---|---|---|
| 0.036 | 10 | 1.03 |
| 0.036 | 18 | 0.79 |
| 0.036 | 29 | 0.59 |

[1] In Table I, the time during which the lead hydroxide was added to the NAG slurry was between 13 and 18 minutes in each run reported, with the exception of runs  and *. The two exceptions mentioned were much larger than the usual batches and the addition times therefor can not be compared directly with the others.

A typical detailed run follows:

20.7 grams of lead hydroxide paste analyzing 88.1% lead hydroxide, was slurried with 64 cc. of water in which were dissolved 0.365 gram of lead acetate and 0.0254 gram of methyl cellulose (15 cps. type). The acetate equivalent to 2% of the lead hydroxide was used because of its solubilizing effect on the paste. The methyl cellulose amounted to 0.03% of the total weight of the lead hydroxide slurry. The resulting suspension was added over a period of 14.5 minutes to a NAG slurry comprising 18.4 grams NAG (2% in excess of the theoretical amount required) in 202 cc. of water, both slurries being stirred throughout the addition period. The temperature was maintained at from 60 to 62° C. during the addition and the ten minute stirring period which followed. After cooling the menstruum to 50° C. in five minutes, the LNAG was filtered, washed with water and alcohol and dried at 50° C. It was found to have an apparent density of 0.78 gram per cc. The material packed well in a standard blasting cap shell and required only 0.250 gram to detonate a No. 6 cap containing a base charge of 0.25 gram of pentaerythritol tetranitrate pressed at 3000 pounds per square inch with at flat pin.

The above run may be modified by using other crystal modifying agents in different proportions than the specified limits where the colloid is added either with the lead hydroxide or the NAG or both, so long as the crystal modifying agent is present during the formation of the LNAG.

While the invention has been described with reference to a specific embodiment, it is to be understood that it is not to be limited thereto, but is to be construed broadly and restricted solely by the scope of the appended claims.

What is claimed:

1. A method of preparing lead nitroaminoguanidine having an apparent density greater than 0.4 gram per cc. which includes the steps of reacting an aqueous suspension of nitroaminoguanadine with an aqueous slurry of lead hydroxide in the presence of a hydrophilic colloid.

2. The method of claim 1 in which the hydrophilic colloid is present in a concentration greater than 0.001% based on the weight of the lead hydroxide slurry.

3. The method of claim 1 in which the hydrophilic colloid is gelatine.

4. The method of claim 1 in which the colloid is completely peptized.

LE ROY V. CLARK.

REFERENCES CITED

The following references are of record in the file of this patent:

UNITED STATES PATENTS

| Number | Name | Date |
|---|---|---|
| 2,137,234 | Brun | Nov. 22, 1938 |
| 2,150,653 | Franz | Mar. 14, 1939 |
| 2,251,101 | Ashley | July 29, 1941 |
| 2,262,229 | Grambalvo | Nov. 11, 1941 |
| 2,265,230 | Hitchens | Dec. 9, 1941 |

FOREIGN PATENTS

| Number | Country | Date |
|---|---|---|
| 17,187 | Australia | 1934 |